UNITED STATES PATENT OFFICE.

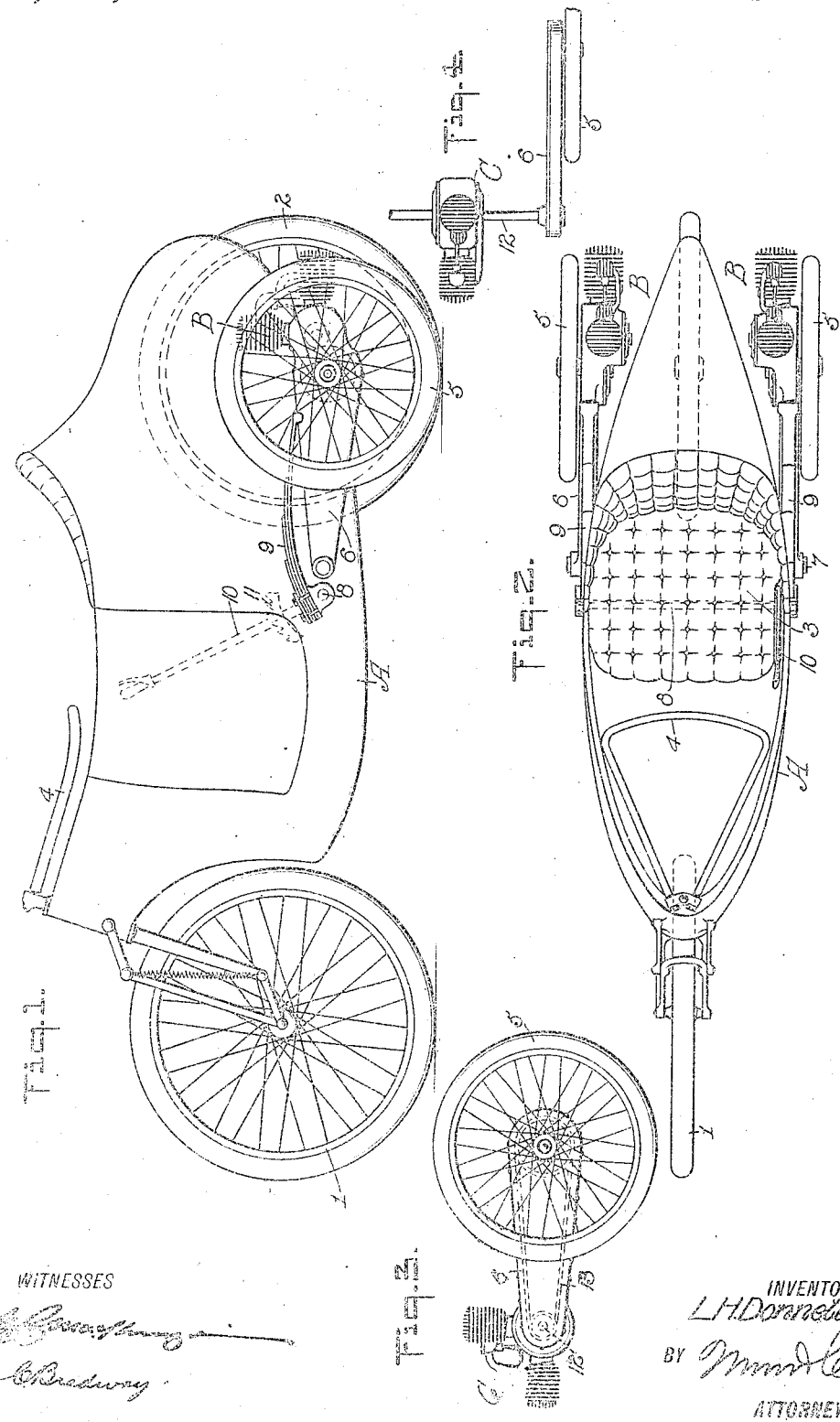

LLOYD HAMILTON DONNELL, OF SYRACUSE, NEW YORK.

MOTOR-VEHICLE.

1,241,355.   Specification of Letters Patent.   Patented Sept. 25, 1917.

Application filed November 29, 1916. Serial No. 134,031.

*To all whom it may concern:*

Be it known that I, LLOYD H. DONNELL, a citizen of the United States, and a resident of Syracuse, in the county of Onondaga and State of New York, have invented a new and Improved Motor-Vehicle, of which the following is a full, clear, and exact description.

This invention relates to motor vehicles and deals particularly with the arrangement of the wheels.

The general object of the invention is to make it possible to combine in a vehicle, cheapness, ease of control, and freedom from lateral swaying, with the comfort of an automobile and the additional advantage of freedom from engine vibration.

A more specific object of the invention is the provision of a vehicle in which the body or frame is mounted upon front and rear large wheels arranged in tandem, and rear driving side wheels so operatively connected with the frame or body and controlled by the operator at will, that the vehicle is self-balanced like an ordinary three or four wheeled vehicle, or can be balanced like a bicycle.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of the vehicle;

Fig. 2 is a plan view thereof;

Fig. 3 is a side view of a modified arrangement of side wheel and driving means; and Fig. 4 is a plan view of Fig. 3.

Referring to the drawing, A designates the body or frame of the vehicle, which is suitably supported on front and rear wheels 1 and 2 which are arranged in tandem relation and in the longitudinal center line of the vehicle. The body is of any desired shape and contains a seat 3 for the driver or occupants, the front wheel 1 being steered by a steering bar 4 or equivalent means in front of the seat. The vehicle is provided with side rear wheels 5 arranged at opposite sides of the rear wheel 2, and they are movably connected with the frame or body A by arms 6 which are pivotally connected at their front ends 7 with the vehicle body, and to the rear ends of the arms the rear wheels 5 are attached. The side wheels are thus capable of movement up and down with respect to the body A. The wheel-supporting arms 6 can be more or less flexibly connected with the body by means under the control of the operator. This means comprises a horizontal shaft 8 extending transversely of the body, and on the ends of this shaft are cantaliver springs 9 which have their rear ends bearing on top of the arms 6 adjacent the rear ends thereof, and the shaft 8 is provided with an operating lever 10, which by being pulled rearwardly places the springs 9 under tension ranging from zero to an amount sufficient to prevent the vehicle from tipping. The lever 10 can be locked in any desired position by means of a toothed sector 11 and a suitable catch means. By throwing the lever 10 forwardly the tension of the springs 9 is decreased.

The propelling power may be applied to the rear side wheels in several ways. For instance, each arm 6 may support an internal combustion engine B, as shown in Fig. 2, and each engine is geared or otherwise suitably connected with its associated wheel 5, or a single engine C may be arranged on a horizontal transverse shaft 12, as in Figs. 3 and 4, and the shaft may be connected by a sprocket chain transmission 13 arranged in the arms 6, with each of the rear wheels 5.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A vehicle comprising a body, a pair of body-supporting wheels disposed in tandem relation, a pair of driving wheels disposed at opposite sides of one of the first-mentioned wheels, and adjustable spring means acting downwardly on the driving wheels.

2. A vehicle comprising a body, front and rear wheels in tandem relation, pivoted arms on the body, power driven wheels mounted on the arms and disposed at opposite sides of the plane of the first-mentioned wheels, springs mounted on the body and pressing downwardly on the arms, and means for varying the tension of the springs.

3. The combination of a vehicle body, front and rear body supporting wheels disposed in tandem relation, a pair of side wheels adjacent one of the first-mentioned wheels, arms connecting the side wheels with the body, motor means operatively connected with the side wheels, and operator-controlled means for exerting a variable tension downwardly on the arms.

4. The combination of a vehicle body, front and rear body supporting wheels, side wheels disposed at opposite sides of the first-mentioned wheels, means for movably connecting the side wheels with the body, motor means for applying power to the side wheels, spring means between the body and side wheels, and operator-controlled means for adjusting the spring means.

LLOYD HAMILTON DONNELL.